United States Patent

Taylor

[19]

[11] Patent Number: 5,900,046
[45] Date of Patent: May 4, 1999

[54] FROTH SEPARATION APPARATUS

[76] Inventor: David Taylor, 22 Henry Street, Gordon, New South Wales, Australia

[21] Appl. No.: 08/847,031

[22] Filed: May 1, 1997

[30] Foreign Application Priority Data

May 1, 1996 [AU] Australia .................................. PN9609

[51] Int. Cl.$^6$ .................................................. B01D 19/00
[52] U.S. Cl. ................................ 95/242; 95/261; 96/176; 96/177; 210/767; 210/787
[58] Field of Search ........................ 95/242, 261; 96/176, 96/177; 210/767, 787, 188, 608

[56] References Cited

U.S. PATENT DOCUMENTS

| | | | |
|---|---|---|---|
| 2,184,195 | 12/1939 | Naucler | 95/242 |
| 2,231,544 | 2/1941 | McCorquodale, Jr. | 95/242 |
| 3,224,964 | 12/1965 | Derenk et al. | 95/242 |
| 3,390,076 | 6/1968 | Dubach | 95/242 |
| 3,421,622 | 1/1969 | Wurtmann | 95/261 |
| 4,931,072 | 6/1990 | Striedieck | 95/242 |
| 5,160,354 | 11/1992 | Ascough | 95/242 |
| 5,219,472 | 6/1993 | Elonen et al. | 95/242 |
| 5,266,481 | 11/1993 | Wegner et al. | 95/242 |
| 5,476,573 | 12/1995 | Hirose et al. | 95/242 |

*Primary Examiner*—Jay H. Woo
*Assistant Examiner*—Minh-Chau T. Pham

[57] ABSTRACT

An apparatus for separating froth from liquid includes a feed conduit to carry partially aerated feed liquid, and a separator to receive and separate the feed liquid into a first component of froth or gas and a second component of de-aerated liquid or sludge.

16 Claims, 1 Drawing Sheet

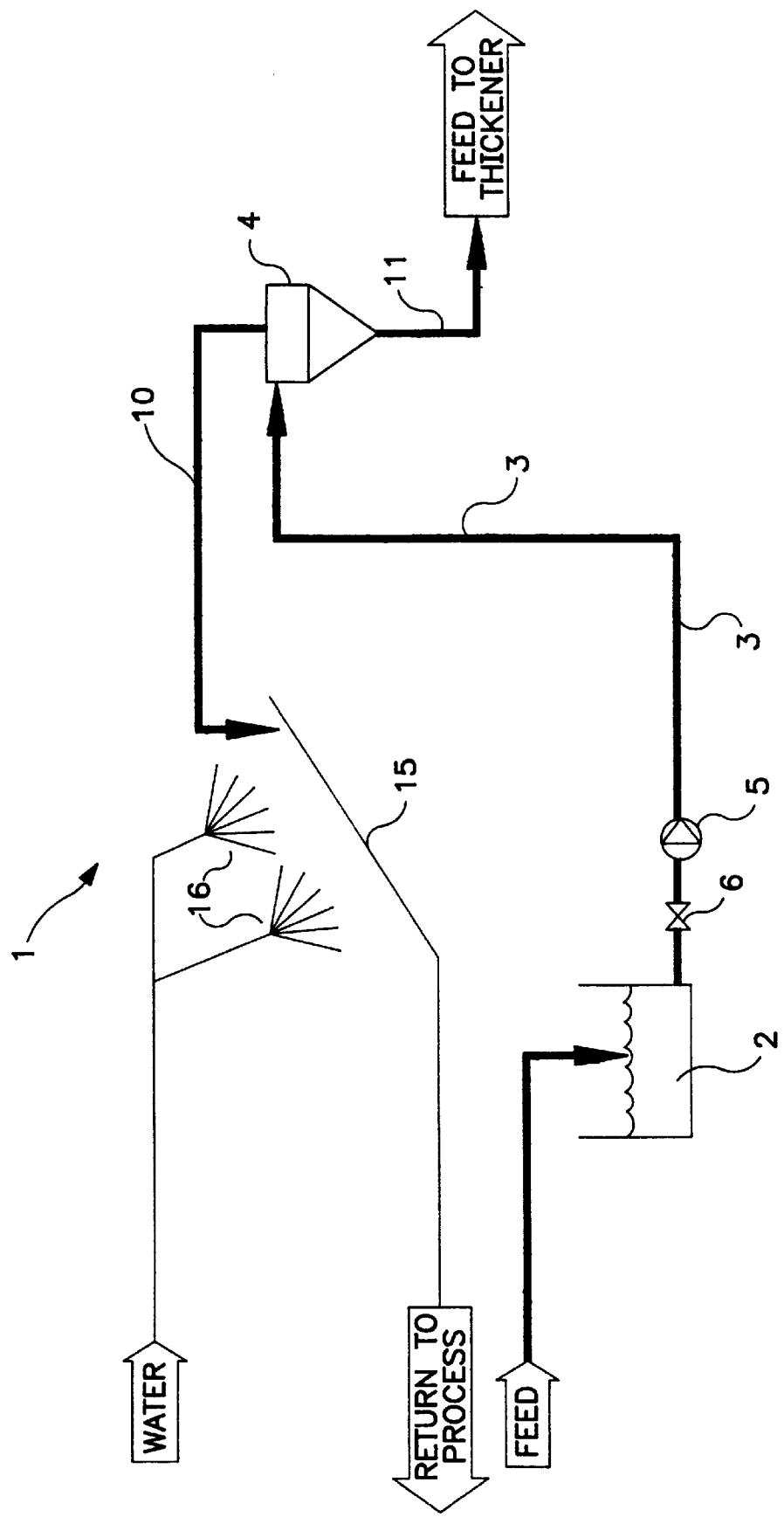

FROTH SEPARATION APPARATUS

BACKGROUND OF THE INVENTION

The present invention relates to a method and apparatus for de-aerating liquids, or separating entrained air or froth from liquids or pulps.

The invention has been developed primarily for use with thickeners, clarifiers, or concentrators and will be described hereinafter with reference to these applications. It will be appreciated, however, that the invention is not limited thereto.

Thickeners, clarifiers and concentrations are typically used for separating solids from liquids and are often found in the mining, mineral processing, food processing, sugar refining, water treatment, sewage treated, and other such industries.

These devices typically comprise a tank in which solids are deposited from suspension or solution and settle toward the bottom as pulp or sludge to be drawn off from below and recovered. A dilute liquor of lower relative density is thereby displaced toward the top of the tank, for removal via an overflow launder. The liquid to be thickened is initially fed through a feedline into a feedwell disposed within the main tank. The purpose of the feedwell is to ensure relatively uniform distribution and to prevent turbulence from the incoming feed liquid from disturbing the settling process taking place within the surrounding tank.

In cases where the feed liquid comprises flotation concentrate, it is normally at least partially aerated. The air bubbles, if allowed to pass from the feedwell into the main tank, tend to produce a considerable amount of relatively stable froth on the surface of both the feedwell and the thickener. This froth can contain a significant proportion of entrained solids and thereby tends to reduce the separation efficiency of the thickener. In addition, air bubbles can become trapped in the sludge, resulting in slower settling rates and lower underflow densities, both of which reduce separation efficiency further still.

SUMMARY OF THE INVENTION

It is an object of the present invention to overcome or substantially ameliorate this problem in the prior art.

Accordingly, the invention provides an apparatus for separating froth from liquid, the apparatus comprising a feed conduit to carry partially aerated feed liquid, and a separator to receive and separate the feed liquid into a first component consisting substantially of froth or gas and a second component consisting substantially of de-aerated liquid or sludge.

Preferably, the separator comprises a centrifugal separator adapted to induce rotational flow of the feed liquid in a separation chamber whereby the froth or gas component emerges as overflow from the separator and the liquid or sludge component emerges as underflow from the separator. A bank of separators connected in series, parallel or a combination of both, may be used to achieve the desired level of separation. In one preferred embodiment, the centrifugal separator is a cyclone separator.

The apparatus preferably further includes an array of liquid spray jets positioned to break down any froth following separation into a third component consisting substantially of liquid, which optionally may be added to the second liquid or sludge component downstream of the separator or recycled upstream thereof into the feed liquid.

The present invention also provides a method for separating froth from liquid, the method comprises the steps of conveying a partially aerated feed liquid to a separator, and separating the feed liquid into a first component consisting substantially of froth or gas and a second component consisting substantially of de-aerated liquid or sludge.

Preferably, the feed liquid is separated by means of a centrifugal separator disposed such that the froth or gas component emerges from the separator overflow and the liquid or sludge component emerges from the separator underflow.

The method preferably comprises the further step of breaking down any froth component by means of liquid spray jets into a third component consisting substantially of liquid.

Optionally, the method comprises the further step of recombining the third liquid component with the second liquid component downstream of the separator or with the feed liquid upstream thereof. Alternatively, the overflow and underflow from the centrifugal separator may be directed to separate downstream process units.

In a preferred embodiment, the invention is used to for removal of flotation froth and air from the feed to a thickener. The thickener preferably comprises a tank in which a dispersed solid component tends to settle from solution or suspension toward a lower region of the tank to be drawn off from below whilst a relatively dilute liquor is thereby displaced toward an upper region of the tank for separation via an overflow launder.

BRIEF DESCRIPTION OF THE DRAWING

A preferred embodiment of the invention will now be described, by way of example only, with reference to the accompanying drawing, which is a schematic flow diagram showing the invention as used in conjunction with a thickener.

DESCRIPTION OF THE PREFERRED EMBODIMENTS

Referring to the drawing, the invention provides an apparatus 1 for separating liquid from froth. The apparatus comprises a sump 2 adapted to receive feed liquid from an upstream process, and a feed conduit 3 extending from the sump to a separator 4. A pump 5 and valve assembly 6 are disposed within the feed conduit 3 to regulate the flow of liquid. Alternatively, the separator 4 may simply receive feed by gravity flow from the upstream process.

The separator takes the form of a centrifugal separation 4 apparatus which has been found, unexpectedly, to be particularly efficient in separating froth from partially aerated pulps by "shearing" the air bubbles form the solid particles. Whilst a single separator 4 is illustrated, it will be appreciated that a plurality of separators connected in series, parallel or a combination of both, may be used depending upon the throughput, the degree of separation required, and other variables. In one preferred form of the invention, a cyclone type centrifugal separator is used.

Within the centrifugal separator 4, the feed liquid is split between the overflow line 10 and the underflow line 11. The split between these lines 10 and 11 can be controlled as appropriate by varying several operating parameters of the centrifugal separator 4 including the diameter of the separator, the separator length, the angle of the separator barrel, the size of the inlet underflow and internal nozzles, the feed pressure and the feed density. In testing it has been found, somewhat surprisingly, that with a partially aerated feed liquid, and approximately tuned operating parameters, a relatively small overflow stream can be produced which contains the vast majority of the froth, leaving a proportionately large volume of de-aerated underflow liquid having a density similar to that of the feed liquid.

In the preferred embodiment of the invention, the underflow 11 feeds the de-aerated liquid from the centrifugal separator 4 to a thickener (not shown). This obviates the problem of accumulation of excess from in the thickener and the associated feedwell, which in prior art devices significantly reduces the efficiency of the thickening process. The froth stream from the centrifugal separator overflow line 10 is fed to a launder 15 and broken down with fine water spray jets 16. This produces a third components consisting of liquid from the spray jets 16 mixed with the liquid from the collapsed froth, which may be combined with the underflow liquid downstream of the centrifugal separator 4 and thence fed to the thickener, or else recycled to the feed liquid upstream of the centrifugal separator 4.

It has also been found, again quite unexpectedly, that by appropriately controlling various process parameters of the separator 4, including flow rate, viscosity, density, dilution ratio, rotational speed, chamber shape, and the like, the froth can be substantially collapsed within the separator 4 such that the overflow stream consists substantially of gas, in which case the supplementary spray jets 16 are not required.

Of course, it will be appreciated that the centrifugal separator arrangement need not necessarily be applied only to thickeners, since the principle of de-aeration performed by the centrifugal separators may be used in numerous other applications. There is also no specific requirement to recombine the overflow from the centrifugal separator 4 with the underflow or with the feed material. The separated streams may simply be directed to discrete downstream process units as required. There is also no need for pumps if sufficient pressure head is otherwise available.

Although the invention has been described with reference to specific examples, it will be appreciated by those skilled in the art that the invention may be embodied in many other forms.

I claim:

1. An apparatus for separating froth from liquid, said apparatus comprising:
   a first conduit to carry partially aerated feed liquid;
   a centrifugal separator receiving and separating the partially aerated feed liquid, by inducing a rotational flow of the feed liquid in a separation chamber, into a first component consisting substantially of froth or gas as an overflow stream from said separator, and a second component consisting substantially of de-aerated liquid or sludge as an underflow stream from said separator; and
   a second conduit for carrying the second component to a downstream process unit.

2. The apparatus according to claim 1, wherein said centrifugal separator is a cyclonic separator.

3. The apparatus according to claim 1, wherein said centrifugal separator comprises a bank of centrifugal separators connected in series or parallel.

4. The apparatus according to claim 1, including an array of liquid spray jets positioned to spray a liquid onto and break down the first component into a third component consisting substantially of a liquid.

5. The apparatus according to claim 4, wherein the third component is added to the second component downstream of said centrifugal separator.

6. The apparatus according to claim 4, wherein the third component is recycled upstream of said centrifugal separator by addition to the feed liquid.

7. The apparatus according to claim 1, wherein the first component is substantially collapsed within said centrifugal separator and the overflow stream consists substantially of gas.

8. An apparatus for removal of flotation froth and air from a feed stream, said apparatus comprising:
   a first conduit for carrying a partially aerated feed liquid;
   a centrifugal separator receiving the partially aerated feed liquid for inducing a rotational flow of the feed liquid in a separation chamber to separate the partially aerated feed liquid into a first component consisting substantially of froth or gas as an overflow stream from said centrifugal separator and a second component consisting substantially of de-aerated liquid of sludge to produce an underflow stream from said centrifugal separator;
   a second conduit for carrying the second component to a thickener; and
   a thickener comprising a tank in which a dispersed solid component tends to settle from solution or suspension toward a lower region of the tank, to be drawn off from below the tank, and a relatively dilute liquor is displaced to toward and upper region of the tank for removal via an overflow launder.

9. A method for separating froth from liquid, said method comprising:
   conveying a partially aerated feed liquid to separation means, and
   centrifugally separating the feed liquid in the separation means, by inducing a rotational flow of the feed liquid in a separation chamber, into a first component consisting substantially of froth or gas, to produce an overflow stream from the separation means, and a second component consisting substantially of de-aerated liquid or sludge, to produce an underflow stream from the separation means.

10. The method according to claim 9, including centrifugally separating the feed liquid in a cyclonic separator.

11. The method according to claim 9, including centrifugally separating the feed liquid in a bank of centrifugal separators connected in series or parallel.

12. The method according to claim 9, including breaking down any froth remaining after centrifugally separating into a third component consisting substantially of liquid, by spraying the froth with liquid through an array of spray jets.

13. The method according to claim 12, including adding the third component to the second component after centrifugally separating the feed liquid.

14. The method according to claim 12, including recycling the third component, before centrifugally separating the feed liquid, by adding the third component to the feed liquid.

15. The method according to claim 9, including substantially collapsing the froth in the first component within the separator means so that the overflow stream comprises consists substantially of gas.

16. A method for separating flotation froth and air from a feed stream, said method comprising:
   conveying a feed stream to separation means;
   centrifugally separating the feed liquid in the separation means, by inducing a rotational flow of the feed liquid in a separation chamber, into a first component consisting substantially of froth or gas, to produce an overflow stream from the separation means, and a second component consisting substantially of de-aerated liquid or sludge, to produce an underflow stream from the separation means;

conveying the underflow stream to a thickener; and separating a solid components dispersed in the underflow stream from the underflow stream by settling in a thickener tank, for drawing off from below the tank, with a relatively dilute liquor being displaced upwardly in the tank for removal via an overflow launder.

* * * * *

UNITED STATES PATENT AND TRADEMARK OFFICE
CERTIFICATE OF CORRECTION

PATENT NO. : 5,900,046
DATED : May 4, 1999
INVENTOR(S) : DAVID TAYLOR

It is certified that error appears in the above-identified patent and that said Letters Patent is hereby corrected as shown below:

Column 4, line 14, change "of" (second occurrence) to --or--;

line 23, delete "to";

change "and" to --an--.

Signed and Sealed this

Sixteenth Day of November, 1999

Attest:

Q. TODD DICKINSON

*Attesting Officer*           *Acting Commissioner of Patents and Trademarks*

UNITED STATES PATENT AND TRADEMARK OFFICE
CERTIFICATE OF CORRECTION

PATENT NO. : 5,900,046
DATED : May 4, 1999
INVENTOR(S) : David Taylor

It is certified that error appears in the above-identified patent and that said Letters Patent is hereby corrected as shown below:

Title page, item [73], Assignee: should read --Supaflo Technologies Pty. Ltd.

Signed and Sealed this

Fifteenth Day of February, 2000

Attest:

Q. TODD DICKINSON

Attesting Officer

Commissioner of Patents and Trademarks

UNITED STATES PATENT AND TRADEMARK OFFICE
CERTIFICATE OF CORRECTION

PATENT NO. : 5,900,046
DATED : May 4, 1999
INVENTOR(S) : David Taylor

It is certified that error appears in the above-identified patent and that said Letters Patent is hereby corrected as shown below:

<u>Column 4,</u>
Line 55, change "separator" to -- separation -- and delete "comprises".

<u>Column 5,</u>
Line 2, change "components" to -- component --.

Signed and Sealed this

First Day of November, 2005

JON W. DUDAS
*Director of the United States Patent and Trademark Office*